United States Patent [19]

Rittenhouse

[11] 4,104,511
[45] Aug. 1, 1978

[54] SAFETY INTERLOCK SYSTEM FOR PRESET COUNTERS

[75] Inventor: Howard E. Rittenhouse, Lindenhurst, Ill.

[73] Assignee: Liquid Controls Corporation, North Chicago, Ill.

[21] Appl. No.: 666,600

[22] Filed: Mar. 15, 1976

[51] Int. Cl.² .................. G06F 15/18; B67D 5/22
[52] U.S. Cl. .................. 235/132 R; 222/15; 235/94 R
[58] Field of Search .................. 235/132 R, 94 R; 222/15, 34

[56] References Cited

U.S. PATENT DOCUMENTS

| | | | |
|---|---|---|---|
| 2,594,853 | 4/1952 | Bliss | 222/34 |
| 3,057,553 | 10/1962 | Billeter | 235/132 R |
| 3,453,420 | 7/1969 | Freese et al. | 235/132 R |
| 3,988,576 | 10/1976 | Smilgys | 235/132 R |

*Primary Examiner*—Stephen J. Tomsky

[57] ABSTRACT

An actuating counter for use in conjunction with a fluid metering device, such as a liquid displacement meter, which can be preset prior to commencement of operation to count out a desired number of product units characterized in that upon actuation of the preset mechanism, further manual operation of the preset mechanism is precluded by an interlock mechanism which is equally adaptable to existing and newly manufactured counters, yet which can be aborted at any time in an emergency.

7 Claims, 5 Drawing Figures

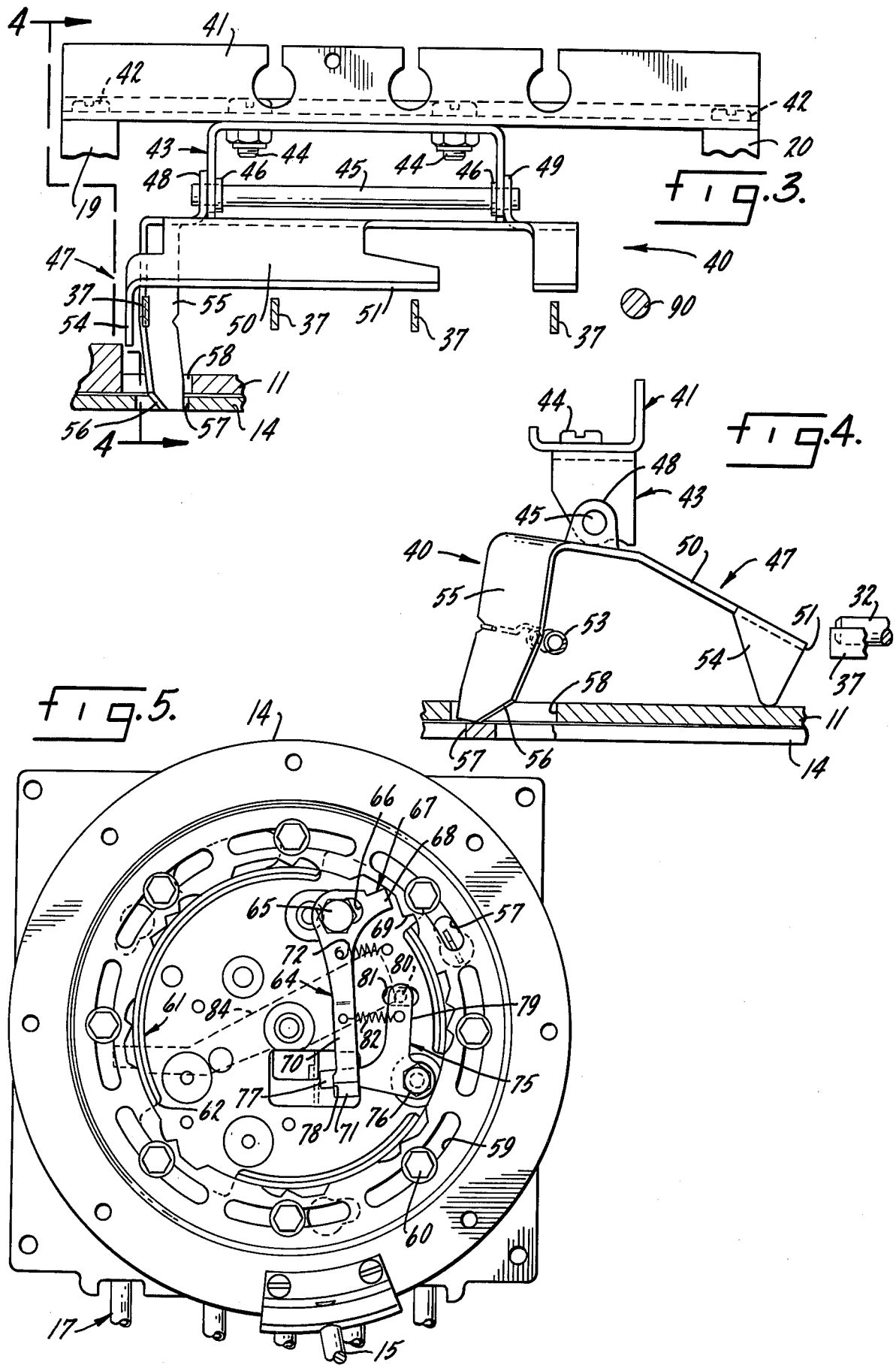

SAFETY INTERLOCK SYSTEM FOR PRESET COUNTERS

This invention relates to actuating counters of the type in which a desired number of units are preset on the counter by appropriate mechanism, and, after said desired number of units are counted out, a control mechanism (such as valve operating linkage) is actuated by the counter. More specifically, the invention relates to a counter as above described which includes means for preventing actuation of the counter, and thereby the control mechanism, prior to count out of the number of units for which the counter was preset.

Actuating counters have been developed which are capable of measuring, and thereafter controlling (as by operation of an on-off valve mechanism), fluid flow with great accuracy. An example of such a counter is illustrated in U.S. Pat. No. 3,057,553, and further discussion of the instant invention will presume a knowledge of the construction and operation of the actuating counter illustrated and described in said patent.

In many environments in which the actuating counter disclosed in the above patent is employed it is desirable to be able to change the preset quantity of units to be measured or counted out after the aforesaid preset quantity has been initially selected and operation commenced, but before the delivery of the preset quantity has been completed.

However, as the uses to which the basic meter in conjunction with which the type of actuating counter described above is used has increased, instances have arisen in which a "lock-out" of the original number of units preset on the counter is desirable, and operation permitted to go to completion after initial actuation.

For example, when a product is sold by the amount preset on the actuating counter and no other means of registration is used, such as a standard reset counter or ticket printer, it is impossible, as a practical matter, to accurately determine the number of units measured or delivered if the preset quantity is changed during the run condition. Accordingly, to ensure accuracy, the preset quantity should be counted out, and any further adjustment in the quantity which is desired made subsequently.

As another example, measuring or dispensation of a known quantity is also desirable if, as is frequently encountered, a multi-compartment truck is operated with all outlet compartment valves open during delivery, and the amount preset on the actuating counter is slightly less than the total amount in the truck so that shut-off occurs prior to totally emptying all compartments. In this instance it is important to keep all feed lines to the meter full of product so no air or vapor may be trapped in them and later metered. This is especially true if no vapor or air eliminating device is used in conjunction with, or mounted on, the meter which is controlled by the actuating counter.

Further, delivery of a fixed quantity may be very helpful in preventing misuse and possible destruction of the preset counter or other associated components. In some such devices, jamming the preset establishes an intentional load on clutches, drives, and bearings that can cause early equipment failure. Further, preloading the preset could cause loads of sufficient magnitude to result in inaccurate measurement, and measurement tolerances established by regulatory bodies can not be met.

Safety considerations can also require assured delivery of a predetermined quantity. Thus, if fluid is to be admitted into a closed vessel which could rupture if the vessel were to be overfilled, it is essential that a quantity of fluid be admitted which is no more than, and, usually, should be somewhat less than, the capacity of the vessel. This consideration may be of crucial importance when a fluid having a significant expansion characteristic in response to temperatures higher than the filling temperatures is encountered. In such a case it is desirable to be able to select a given quantity which is within the available capacity, and then be certain that only that preselected quantity, and no more, is admitted to the vessel, thereby guarding against over-filling, assuming of course that the original calculation of the capacity is correct.

Accordingly, a primary object of the invention is to provide an actuating counter having interlock means which precludes interruption of operation of the actuating counter, and thereby the mechanism, such as a valve, controlled thereby, until the predetermined number of units of product selected prior to operation has been delivered under normal operating conditions.

Another object is to provide an actuating counter as described above in which operation of the actuating counter can be aborted after establishment of run condition for emergency reasons.

Yet another object is to provide an actuating counter as above described in which blocking operation of the means for presetting the desired number of units is accomplished automatically by operation of mechanism, usually a manually actuated lever assembly, when moved to a flow, or open, position.

Yet a further object is to provide an actuating counter as above described in which a blocking or interlock lever, which, when actuated, precludes voluntary change of the quantity selection mechanism, and is automatically cammed into a blocking or interlock position upon actuation of the lever assembly or other mechanism which initiates product flow.

Yet another object is to provide interlock means, which, when actuated, precludes interruption of operation of an actuating counter with which it is associated during the period the flow of a preselected quantity of product occurs under normal operating conditions.

Another object is to provide interlock means as above described in which operation of the interlock means can be aborted after establishment of run conditions for emergency reasons.

A further object is to provide an interlock means as above described which may be added to actuating counters in service in the field without total disassembly, or rework of existing parts.

Another object is to provide an interlock means as above described which, without modification, can be installed in actuating counters in service in the field or incorporated in an actuating counter as original equipment during the manufacture thereof.

Other objects and advantages of the invention will be apparent from a consideration of the disclosure in this specification.

The invention is illustrated more or less diagramatically in the accompanying drawing in which:

FIG. 3 is a section view, to an enlarged scale, taken substantially along the line 3—3 of FIG. 2, with parts omitted and others broken away for clarity;

FIG. 4 is a view taken substantially along the line 4—4 of FIG. 3; and

FIG. 5 is a bottom plan view with parts omitted and others broken away for clarity.

Like reference numerals will be used to refer to the same element from Figure to Figure.

Figure 1:
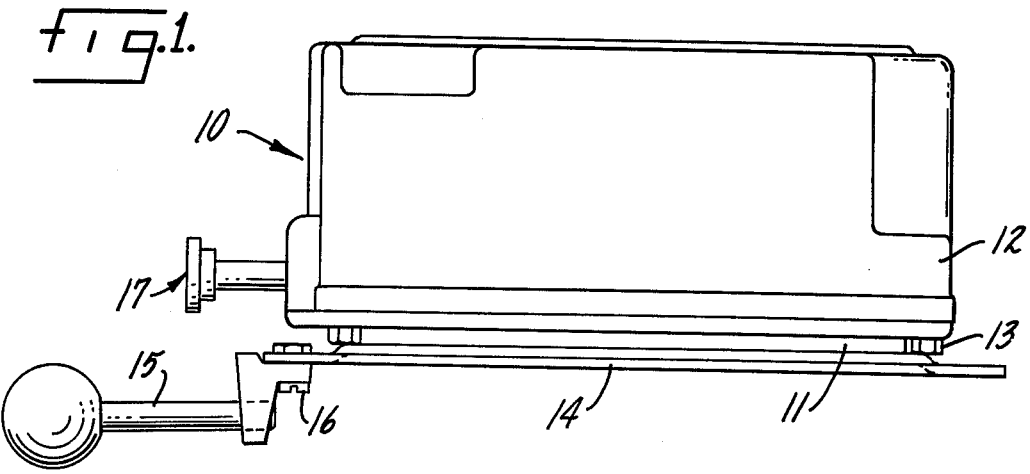
FIG. 1 is a side elevational view.

Referring first to FIG. 1, an actuating counter, also known as a preset counter, is there indicated generally at 10. The counter includes a housing assembly which consists of a base plate 11, which, in effect, forms part of a frame means carried by a fluid meter as will be apparent hereinafter, and a housing cover 12 secured thereto by any suitable means such as bolts 13. A latching ring, also known as a trip ring, is indicated at 14 and a handle, indicated at 15, is secured thereto by any suitable means, such as bolts 16. In operation, the trip ring 14 is moveable with respect to the base plate 11 as will be apparent from the following description. An emergency key for aborting operation of the actuating counter in the event an emergency condition arises is indicated generally at 17, the operation of which will be explained in greater detail hereinafter.

It will be understood that the preset counter is of the type in which a predetermined quantity of product to be counted out can be preset thereon, and, after the aforesaid predetermined quantity is counted out, the counter operates to terminate further product flow. It will be further understood that the actuating counter is desirably assembled in conjunction with a liquid displacement meter, or other flow measuring or metering device. In one widely used application, an actuating counter is driven from a gear box which in turn is driven from a liquid displacement meter through which the fluid product to be measured or counted out flows. A valve is invariably used in conjunction with the meter, the operation of the valve being under the control of the preset counter. Additional equipment may be employed including a strainer, a visible register, a temperature compensator, and a vapor or air eliminator, but the use of such accessory equipment will vary from installation to installation. A typical installation which contains, (in addition to the meter, gear box, preset counter, and valve), a strainer, visible register, and temperature compensator is illustrated in FIG. 1 of the aforesaid U.S. Pat. No. 3,057,553.

Figure 2:
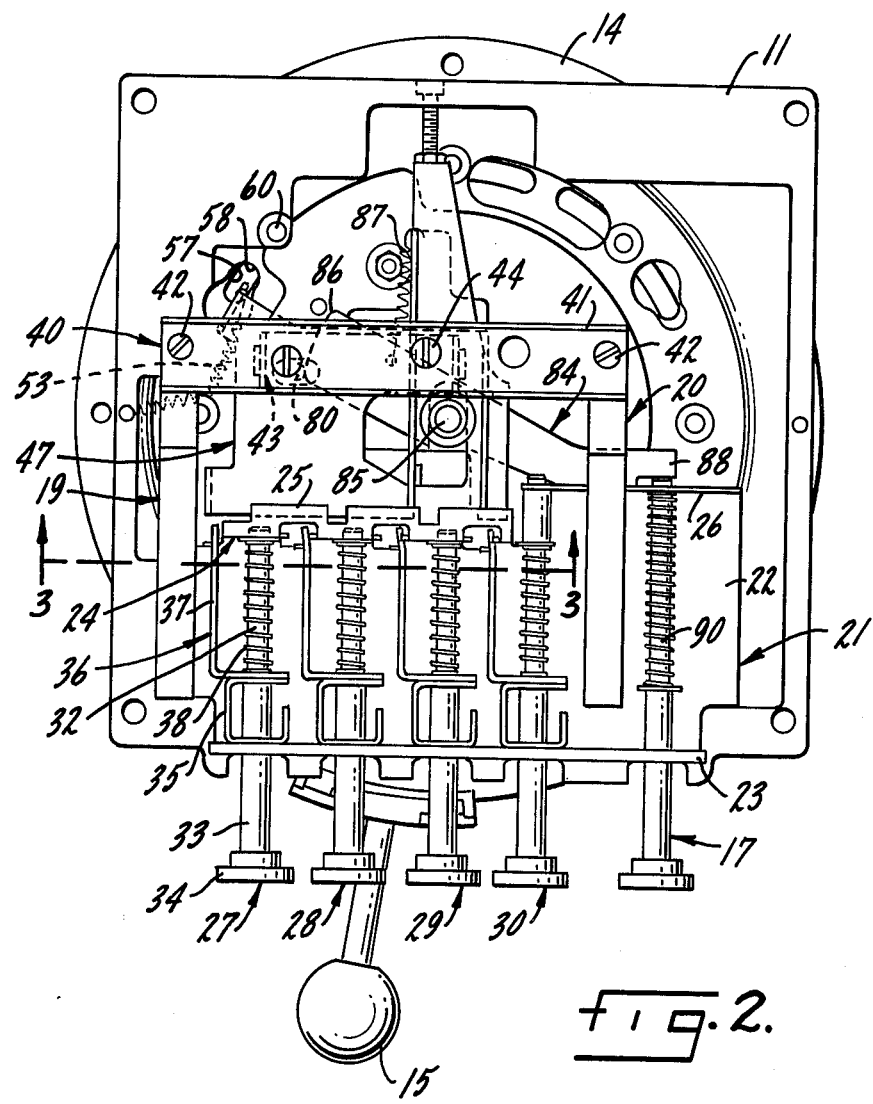
FIG. 2 is a top plan view with the cover and many other parts omitted for clarity.

Referring now to FIG. 2, in which the housing cover 12 and certain other parts have been omitted for clarity, it will be noted that a pair of side plates, 19 and 20, are carried by the base plate 11, and secured thereto by any suitable means not shown. A reset key bracket or brace is indicated generally at 21, the bracket being secured to base plate 11 by any suitable means, and having a center plate portion 22 which terminates, as its forward edge, in an upstanding flange 23. The left rear portion of reset key bracket 21 terminates in a first, discontinuous flange 24, which includes a vertical portion extending perpendicular to the center portion 22, and then a rearwardly extending lip 25, and a second flange 26 which, in this instance, merely extends upwardly from center plate 22, and does not include a lip equivalent to the lip 25 on left rear flange 25. The front flange 23 and left and right rear flanges 24, 26 have aligned apertures formed therein to receive a number of finger or preset keys 27, 28, 29, and 30, and the emergency key 17.

Since the construction and operation of each of preset keys 27 – 30 are similar, a description of one will suffice for each.

Preset key 27 includes a stationary shaft 32 which is secured to left rear flange 24 and projects forwardly therefrom, and preferably terminates short of front flange 23. The forward end of shaft 32 is received within a hollow sleeve 33, the internal diameter of the sleeve being sufficient to accommodate shaft 32 in slideable relationship. A finger button 34 is carried by the forward end of sleeve 33. A generally U-shaped spacer 35 is carried by the rear end portion of sleeve 33, the spacer functioning to prevent forward movement of the key past the position illustrated in FIG. 2. A strike arm 36 is also carried by the sleeve 33, the strike arm having a rearwardly projecting portion 37 which is aligned with a cut-away portion in left rear flange 24 for a purpose which will be explained hereinafter. A spring 38 is biased to resiliently urge sleeve 33, and thereby the strike arm 36, in a forward or outward direction with respect to shaft 85 as viewed in FIG. 2.

It will be understood that the preset keys 27, 28, 29 and 30 are an integral part of the mechanism by which number wheels, which are visible from the front of the preset counter, are actuated, the keys carrying structure for engaging and rotating the number wheels in increments of a revolution. For example, in the application illustrated in the aforesaid patent, the preset keys are so arranged that each reciprocation of a key results in a rotation of 36° of the number wheel with which it is associated, with each number wheel being rotated independently of any other number wheel. Since the location and operation of the number wheels per se is not essential to an understanding of the invention, nor does the rotative action differ in the instant environment over the environment shown in the aforesaid patent, the number wheels are not further illustrated or described.

Referring now to FIGS. 2, 3, and 4, and in the first instance to FIGS. 3 and 4, a stop bracket assembly is indicated in those two Figures generally at 40. The assembly includes a guide plate 41 which is fastened by any suitable means, such as bolts 42, to the rear end portion of side plates 19 and 20. The guide plate includes front and rear upstanding flanges which are not pertinent to the present disclosure. A generally inverted, U-shaped stop bracket is indicated generally at 43, the bracket being secured to guide plate 41 by bolts 44. The terminal end portions of the stop bracket have aligned holes formed therein to receive a stop shaft 45, which shaft may be precluded from axial reciprocation by any suitable means, such as ring washers 46 which are received in matching ring grooves in the shaft.

A stop or interlock member is indicated generally at 47. The interlock includes a pair of mounting ears 48, 49 which extend upwardly from the midsection of the interlock member and are received on the end portions of stop shaft 45 to thereby pivotally support the interlock 47 from the stop bracket and guide plate.

Interlock member 47 includes a forward section or skirt 50 which extends downwardly from the midsection of the interlock member. The forward edge 51 of the front skirt 50 is so contoured that when the interlock member is rotated to its furthest position in a clockwise direction, as illustrated in FIG. 4, the edge 51 will be aligned with the rearwardly projecting portions 37 of the strike arms 36. Movement of the strike arms, and thereby the preset keys (except for the slight distance illustrated in FIG. 4, which distance is insufficient to cause actuation of the number wheel controlled by the preset key), is thereby precluded. The forward abutment edge 51 will however provide no obstruction to horizontal reciprocal movement of the projection 37 of strike arm 36 when the interlock member is disposed in its furthest counter-clockwise position as illustrated in FIG. 3.

Interlock member 47 is biased into the elevated position of FIG. 3 by any suitable means, in this instance a spring 53, one end of which is secured to the stationary base plate 11, and the other end to the rear side of the interlock member, whereby the interlock member is continuously resiliently biased in a counter-clockwise direction.

A stop abutment is indicated at 54 to limit the extent of clockwise movement of the interlock member.

The rear portion of interlock member 47, that is the portion to the left of shaft 45 as viewed in FIG. 4, includes blocking cam means 55 which terminates in a camming surface 56 at its lower end. As can be appreciated from FIGS. 3 and 4, the camming surface 56 is arranged to be engaged by the edge of an aperture 57 in trip ring 14 when the trip ring moves relative to base plate 11, and the interlock member thereby cammed in a clockwise direction about shaft 45.

Referring now to FIGS. 2 and 5, and initially to FIG. 5, it will be noted that trip ring 14 is here shown mounted to base plate 11 by a series of arcuate apertures 59 and cooperating bolts 60, the bolts 60 having an enlarged washer type head which supports the trip ring in spaced slideable relationship to base plate 11. Although bolts 60 have been disclosed herein it should be understood that trip ring 14, when assembled to the balance of the entire assembly of which it forms a part (as illustrated in FIG. I of the aforesaid patent), will be supported by a flange which projects upwardly from the meter, and bolts 60 omitted.

A cylindrical flange 61, which is cut away at several locations, such as at 62, projects downwardly from the bottom of base plate 11. The outer diameter of the discontinuous cylindrical flange 61 is received snugly, but slideably, within the internal edge of the ring shaped trip ring 14.

Mechanism for holding the trip ring 14 in fixed position with respect to base plate 11, and releasing engagement when required, is illustrated best in FIGS. 2 and 5.

Referring first to FIG. 5 it will be seen that a sear is indicated at 64, the sear being mounted for rotation about the shank of a mounting bolt 65 which is received within a slot 66 in sear 64. The bolt 65 has limited reciprocation along the short path provided by slot 66. The sear includes a locking arm 67, which terminates in a projection 68 which in turn is arranged to be received in slot 69 formed in the inner edge of trip ring 14. The sear further includes a second arm 70 which terminates, as its extremity, in a flange 71 which projects upwardly as viewed in FIG. 2. Spring 72 continuously resiliently biases sear 64 to turn in a counterclockwise direction as viewed in FIG. 5.

An L-shaped latch member is indicated generally at 75, the latch member being mounted for pivotal movement about the axis of a mounting bolt 76 which is fast with the base plate 11. The latch member 75 includes a first arm 77 which has a recess 78 near the outer extremity thereof, which recess is adapted to receive and release sear flange 71. The latch member further includes a second arm 79 which carries, at its outer extremity, a pin 80 which projects upwardly through a slot 81 in base plate 11. Spring 82 continuously resiliently biases the L-shaped latch member in a counter-clockwise direction as viewed in FIG. 5.

Referring now to FIG. 2 particularly, an emergency stop lever is indicated generally at 84, the stop lever being mounted for pivotal rotation about the shaft 85 which may, for example, be equivalent to the register drive shaft illustrated in the aforesaid U.S. patent.

The emergency stop lever includes a camming edge 86 at its leftmost extremity, the camming edge being contoured to engage, and displace, pin 80 carried by L-shaped latch member 75 when the stop lever is moved in a counter-clockwise direction.

A spring 87 continuously resiliently biases emergency stop lever 84 in a clockwise direction.

The right end of the emergency stop lever terminates in an actuating flange 88.

Referring now to FIG. 2 particularly, emergency key 17 includes an extension rod 90 whose forward end is aligned with and received within sleeve 33, and whose rearward end is received within an aperture in rear flange 26. Extension rod 90 is further aligned with actuating flange 88 so that, upon depression of emergency key 17, emergency stop lever 84 will be engaged and rotated in a counter-clockwise direction as viewed in FIG. 2.

The use and operation of the invention is as follows.

Assume that the actuating counter is in a condition in which the on-off flow control mechanism which is operated by the actuating counter is in a flow-off condition.

In this condition, the sear locking arm projection 68 will be in engagement with the slot 69 in the notch formed in the internal periphery of trip ring 14. The cam arm 55 of interlock member 47 will be in the position illustrated in FIG. 3, that is, projecting through the aligned apertures 57 and 58 in trip ring 14 and base plate 11, thereby preventing relative rotation between the trip ring 14 and base plate 11.

In this condition, the abutment edge 51 of the interlock member 47 will be disposed out of blocking engement with the strike arms 36 by virtue of the bias exerted by spring 53.

To actuate the system, the preset keys 27 – 30 will then be operated by the attendant to preselect, that is preset, a unit of products desired by suitable key depression until the appropriate number of units appear in the start position.

After the units have been preset, handle 15 is moved clockwise.

Movement of handle 15 performs two functions, namely (1) operation of the actuating counter so that product flow can commence and (2) block out or blockage of the preset keys during normal operation so that the quantity of product units which have been preselected will assuredly be metered out, and manual override of the operation by use of the preset levers 27 – 30 will be precluded.

This latter operation is performed as follows.

As the trip ring 14 moves clockwise, as viewed in FIG. 2, with respect to base plate 11, the edge of slot 57 will strike camming surface 56 on the cam arm 55 and force the interlock member 47 in a clockwise direction as viewed with respect to the axis of shaft 45 in FIG. 4. The interlock 47 will be moved to the position of FIG. 4. In the FIG. 4 position, the abutment edge 51 of skirt section 50 is aligned with the ends of the strike arms 36 for preset levers 27 – 30 and therefore any movement of the preset levers is precluded.

Upon count-out of the preselected quantity of product units, the mechanisms illustrated in the aforesaid U.S. Pat. No. 3,057,553, will cause the trip ring 14 to move counter-clockwise with respect to base plate 11 as viewed in FIG. 2 and the on-off product flow control mechanism will be moved to the off-flow position.

Simultaneously, the blocking cam means 55 of interlock member 47 will return from the position of FIG. 4 to the position of FIG. 3, and interlock member 47 will thereby pivot around shaft 45 under the urging of spring 53, which results in return of the abutment edge 51 of skirt portion 50 to the position of FIG. 3.

The mechanism is then in preparation for a subsequent operation.

In the event it becomes necessary to terminate operation of the system for any reason after product flow has begun, the flow can be stopped by pressing the preset lever 17, the button of which may advantageously be the traditional red color.

Depression of preset lever 17 causes rod extension 90 to strike actuator flange 88 thereby pivoting emergency stop lever 84 about its shaft 85 in a counter-clockwise direction.

As the stop lever moves counter-clockwise, camming edge 86 contacts pin 80 which causes L-shaped bracket 75 to pivot clockwise about its mounting bolt 76, thereby dropping latch arm 77, and recess 78 therein, whereby spring 82 causes the sear 64 to rotate counter-clockwise as viewed in FIG. 5. As the sear rotates counter-clockwise, projection 68 is moved out of abutting engagement with the abutment edge of slot 69 and trip ring 14 moves to a product flow-off condition under the urging of a biasing spring, not shown.

It will thus be apparent that if, at any time after operation commences, an emergency condition arises, the operation can be aborted and operation stopped.

It is especially significant to note that blocking operation of, that is, interlocking, the preset lever is accomplished automatically by rotation of the trip ring as the on-off flow mechanism, such as a valve, is opened, and flow of product begins to pass through the meter or other measuring device.

It is further of importance that even though operation of the preset levers 27 – 30 are precluded during normal run conditions, the system can be aborted manually at any time by operation of the emergency key 17 so that a safety override feature is always present.

It should further be noted that although the invention has been illustrated for ease of understanding in conjunction with a system in which only two basic operating conditions are disclosed, namely, full-flow and no-flow, the invention is equally applicable to systems in which one or more intermediate flow conditions are possible. As those skilled in the art can appreciate, frequently it is undesirable to operate such a system with a rapid cut-off of flow because of the shock to the system. Consequently, it is conventional to make provision for at least one slow-flow condition. Specifically, as the number of units physically delivered or metered approaches the number of units preset on the actuating counter, and usually when a fixed number of units remain to be delivered, the handle 15 will move a portion of the distance from the full-flow position to the full-off position, or, in other words, to a slow-flow position. Provision for such partial return is herein illustrated by the additional slots, not numbered, in the internal surface of trip ring 14 which are arranged to receive the projection 68. Movement of the trip ring 14 to a slow-flow position can result in maintenance of the abutment edge 51 in interlocking position or displacement therefrom, depending on the length of slot 57 and further structural modifications which are within the skill of the art. In this instance, the parts are so contoured that movement of trip ring 14 to a slow-flow position will result in movement of skirt 50 to the unblocked position of FIG. 3, and this is the preferred arrangement in view of the relatively small fluid quantities which can possibly be affected.

Although a preferred embodiment of the invention has been illustrated and described, it will be apparent to those skilled in the art from a reading of the instant disclosure that further modifications and advantages are inherent in the disclosed embodiment. Accordingly, it is intended that the scope of the invention be limited soley by the scope of the hereafter appended claims, and not by the precise statement of the foregoing exemplary embodiment.

I claim:

1. In combination in an actuating counter of the type in which a predetermined quantity of product to be counted out can be preset thereon, and which operates to terminate product flow through a fluid meter by actuation of off-on flow control valve means in a fluid flow conduit upon count-out of the predetermined quantity, frame means carried by the fluid meter,
flow control actuating means carried by the frame means and adapted for connection to on-off flow control mechanism,
said flow control actuating means including
firstly, an actuating member which is moveable from a first, flow closed position to a second, flow open position, and returnable to a flow closed position.
secondly, pre-set means operable at any time said actuating member is in a flow closed position for establishing a predetermined quantity of product units to be counted out whereby a desired quantity of product units can be preset on the actuating counter,
thirdly, structural means for moving the actuating member from the second, flow open position, to flow closed position upon count-out of the desired quantity of units established by the preset means, and
fourthly, interlock means disposed in a blocking and unblocking relationship to the preset means,
said interlock means being actuateable simultaneously with movement of said off-on flow control actuating means into a flow on condition,
said interlock means including a blocking member,
said blocking member consisting of an abutment member which is pivoted about an axis which is fixed with respect to the frame means,
said abutment member having a first portion which moves between a blocking position in which it provides an obstruction to the operation of the preset means, and a clearance position in which it provides no obstruction to the operation of the preset means, and
a second portion which is in operative engagement with the actuating member,
said second portion being arranged to be cammed by movement of the actuating member, and thereby interaction between the actuating member and said second portion, from a first position which causes the first portion to be disposed in a locking position, to a second position in which the aforesaid first portion is in a clearance position, and means for resiliently urging the abutment member into a position in which the first portion obstructs the operation of the preset means, said interlock means further being operable to preclude interference, except in an emergency, with the pre-set means until the quantity of product units established by the pre-set means have been counted out.

2. The actuating counter of claim 1 further characterized by and including emergency stop means operable at any time during count out of the product units to actuate the actuating member, and thereby terminate product flow.

3. The actuating counter of claim 1 further characterized in that the abutment member is cammed into and out of preset blocking obstruction by impingement of the actuating member directly with the abutment member.

4. The actuating counter of claim 3 further characterized in that firstly, the frame means and actuating member apertures are arranged to be in alignment one with the other when the actuating member is moved to a position in which the actuating member is in a second, flow open position, and secondly, in that the second portion of the abutment member includes a projection integral therewith which is received within the aligned apertures in the actuating member and frame means, to thereby prevent relative movement between the actuating member and the frame means.

5. Interlock means for precluding movement of preset means in an actuating counter of the type in which a predetermined quantity of products to be counted out can be preset thereon, and which operates to terminate product flow upon count-out of the predetermined quantity, said interlock means including a blocking member, said blocking member, upon actuation, being arranged and disposed to preclude operation of the preset means, said blocking member being actuated in response to actuation of an on-off flow control mechanism, said blocking member consisting of an abutment member which is pivoted about an axis which is fixed with respect to frame means of the actuating counter, said abutment member having a first portion which moves between a blocking position in which it provides an obstruction to the operation of the preset means of the actuating counter, and a clearance position in which it provides no obstruction to the preset means of the actuating counter, and a second portion which is in operative engagement with the actuating member of the actuating counter which in turn controls the on-off flow control mechanism, said second portion being arranged to be cammed by movement of the aforesaid actuating member, and thereby interaction between the actuating member and said second portion, from a first position which causes the first portion to be disposed in a locking position, to a second position in which the aforesaid first portion is in a clearance position, and means for resiliently urging the abutment member into a position in which the first portion obstructs the operation of the preset means.

6. The interlock means of claim 5 further characterized in that the abutment member is cammed into and out of preset blocking obstruction by impingement of the actuating member directly with the abutment member.

7. The interlock of claim 6 further characterized in that firstly, the frame means and actuating member have apertures which are arranged to be in alignment one with the other when the actuating member is moved to a position in which the actuating member is in a second, flow open position, and secondly, in that the second portion of the abutment member includes a projection integral therewith which is received within the aligned apertures in the actuating member and frame means, to thereby prevent relative movement between the actuating member and the frame means.

* * * * *